(12) United States Patent
Stallings, Jr. et al.

(10) Patent No.: US 9,578,000 B2
(45) Date of Patent: *Feb. 21, 2017

(54) CONTENT LEVEL NAVIGATION SYSTEMS AND METHODS

(71) Applicant: Verizon Patent and Licensing Inc., Arlington, VA (US)

(72) Inventors: Heath Stallings, Jr., Colleyville, TX (US); Donald H. Relyea, Dallas, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 248 days.

This patent is subject to a terminal disclaimer.

(21) Appl. No.: 14/275,107

(22) Filed: May 12, 2014

(65) Prior Publication Data

US 2014/0250381 A1 Sep. 4, 2014

Related U.S. Application Data

(63) Continuation of application No. 11/956,605, filed on Dec. 14, 2007, now Pat. No. 8,726,159.

(Continued)

(51) Int. Cl.
*G09G 5/00* (2006.01)
*G09B 3/00* (2006.01)
(Continued)

(52) U.S. Cl.
CPC ............ *H04L 63/08* (2013.01); *G06F 3/0482* (2013.01); *G06F 3/0487* (2013.01); *G06F 3/04817* (2013.01); *G06F 3/04842* (2013.01); *H04L 12/4625* (2013.01); *H04N 5/76* (2013.01); *H04N 5/765* (2013.01); *H04N 5/775* (2013.01); *H04N 7/17318* (2013.01); *H04N 21/433* (2013.01);
(Continued)

(58) Field of Classification Search
CPC . H04N 5/44543; H04N 21/482; G06F 3/0482; G06F 3/0481
See application file for complete search history.

(56) References Cited

U.S. PATENT DOCUMENTS

| 4,977,455 A | 12/1990 | Young |
| 5,151,789 A | 9/1992 | Young |

(Continued)

OTHER PUBLICATIONS

Uchyigit, et al., "A Personalised Multi-Modal Electronic Program Guide," Department of Computing, Imperial College, London, seven pages, 2003.

*Primary Examiner* — Jordany Nunez

(57) ABSTRACT

An exemplary system includes a media content processing subsystem configured to provide a first interactive graphical user interface to a display for presentation to a user in response to a transmission of an input command, provide an end interactive graphical user interface to the display for presentation to the user in response to a repeat transmission of the input command, and perform an action corresponding to a selected entry within the end interactive graphical user interface in response to another repeat transmission of the input command. The first interactive graphical user interface corresponds to a first content level within a navigation thread and the end interactive graphical user interface corresponds to an end content level within the navigation thread.

19 Claims, 16 Drawing Sheets

Related U.S. Application Data

(60) Provisional application No. 60/879,003, filed on Jan. 5, 2007.

(51) Int. Cl.
  *G06F 3/048*   (2013.01)
  *H04L 29/06*   (2006.01)
  *H04L 12/46*   (2006.01)
  *H04N 5/76*    (2006.01)
  *H04N 5/765*   (2006.01)
  *H04N 5/775*   (2006.01)
  *H04N 7/173*   (2011.01)
  *H04N 21/433*  (2011.01)
  *H04N 21/482*  (2011.01)
  *H04N 21/84*   (2011.01)
  *G06F 3/0481*  (2013.01)
  *G06F 3/0482*  (2013.01)
  *G06F 3/0484*  (2013.01)
  *G06F 3/0487*  (2013.01)
  *H04N 5/781*   (2006.01)
  *H04N 5/85*    (2006.01)
  *H04N 5/907*   (2006.01)

(52) U.S. Cl.
  CPC ............ *H04N 21/482* (2013.01); *H04N 21/84* (2013.01); *H04N 5/781* (2013.01); *H04N 5/85* (2013.01); *H04N 5/907* (2013.01)

(56) References Cited

U.S. PATENT DOCUMENTS

| | | |
|---|---|---|
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,657,091 A | 8/1997 | Bertram |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,822,123 A | 10/1998 | Davis et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,990,890 A | 11/1999 | Etheredge |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knee et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,485 B2 * | 2/2004 | Hopkins ................. G09B 5/00 434/118 |
| 6,687,906 B1 | 2/2004 | Yuen et al. |
| 6,732,369 B1 | 5/2004 | Leftwich et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,766,526 B1 | 7/2004 | Ellis |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,876,397 B2 | 4/2005 | Funakoshi et al. |
| 7,039,935 B2 | 5/2006 | Knudson et al. |
| 7,069,576 B1 | 6/2006 | Knudson et al. |
| 7,418,670 B2 * | 8/2008 | Goldsmith ............ G06F 3/0482 715/810 |
| 7,487,529 B1 | 2/2009 | Orlick |
| 7,694,233 B1 * | 4/2010 | Ording .................. G06F 3/0481 715/788 |
| 8,161,411 B2 * | 4/2012 | Robbin .................. G06F 9/4443 715/727 |
| 8,739,052 B2 * | 5/2014 | Ostojic .............. H04N 7/17318 715/763 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0083449 A1 | 6/2002 | Im |
| 2002/0124255 A1 | 9/2002 | Reichardt et al. |
| 2003/0005445 A1 | 1/2003 | Schein et al. |

(56) References Cited

U.S. PATENT DOCUMENTS

| | | |
|---|---|---|
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0100504 A1 * | 5/2004 | Sommer ............... G06F 3/0482 715/810 |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0184966 A1 | 8/2006 | Hunleth et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0022450 A1 | 1/2007 | Kim et al. |
| 2007/0033613 A1 | 2/2007 | Ward et al. |
| 2007/0107010 A1 | 5/2007 | Jolna et al. |
| 2007/0220580 A1 | 9/2007 | Putterman et al. |
| 2009/0034931 A1 | 2/2009 | Stone et al. |

* cited by examiner

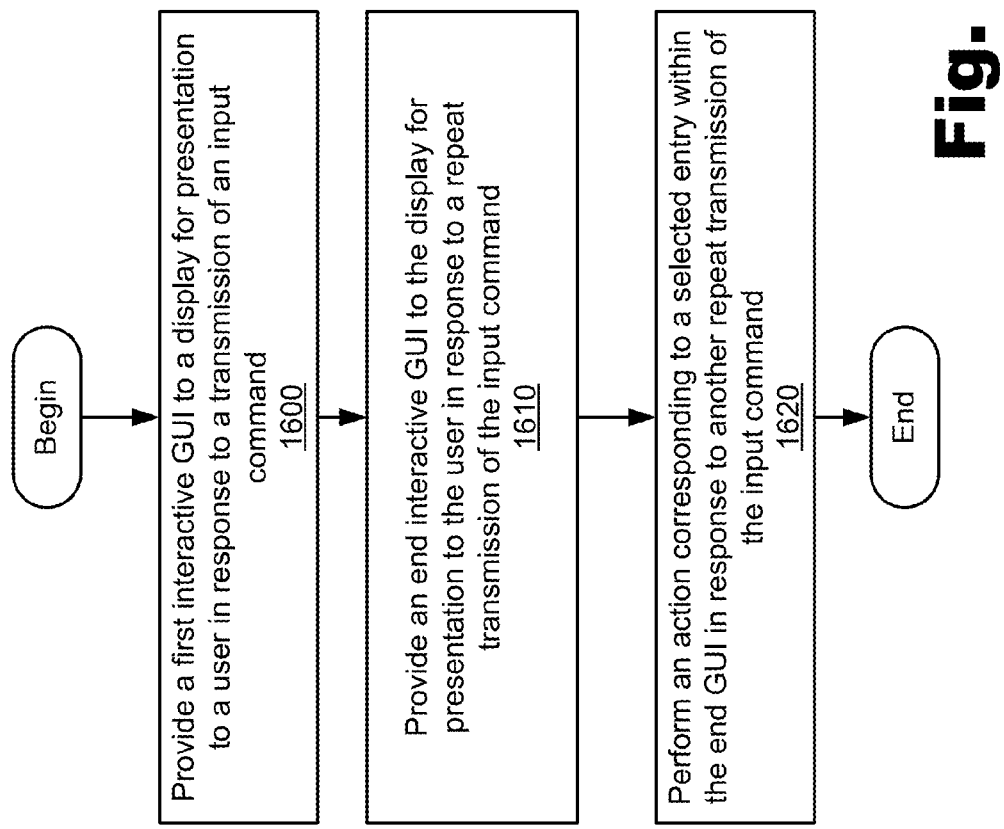

CONTENT LEVEL NAVIGATION SYSTEMS AND METHODS

RELATED APPLICATIONS

The present application is a continuation application of U.S. patent application Ser. No. 11/956,605, filed Dec. 14, 2007, and entitled CONTENT LEVEL NAVIGATION SYSTEMS AND METHODS, which application claims priority under 35 U.S.C. §119(e) to U.S. Provisional Patent Application No. 60/879,003, filed on Jan. 5, 2007, and entitled USER INTERFACE FUNCTIONS FOR MEDIA CONTENT ACCESS SYSTEMS AND METHODS. Both applications are hereby incorporated by reference in their entirety.

BACKGROUND INFORMATION

The set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

The large number of media content choices offered by providers can make it difficult for a user of an STB to find and select desired media content. For example, it is often cumbersome to find and select a desired media content instance for viewing and/or access any of the other features of the STB. On-screen graphical user interfaces have alleviated this confusion to some degree. However, many on-screen user interfaces are difficult to use and therefore result in missed viewing opportunities.

Moreover, conventional tools for navigating within on-screen user interfaces typically require the use of multiple input buttons on a remote control input device. This can be confusing and non-intuitive for a user, and may discourage the use of such on-screen user interfaces.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 16 illustrates an exemplary method of providing and navigating a navigation thread according to principles described herein.

DETAILED DESCRIPTION OF PREFERRED EMBODIMENTS

Exemplary content level navigation systems and methods are disclosed herein. The exemplary systems and methods may provide a capability of navigating through content that may be available via a media content processing subsystem are described herein. As used herein, the term "content" refers generally to any option, feature, media content instance, menu, graphical user interface, and/or directory that is accessible via a media content processing subsystem.

The exemplary systems and methods described herein may generally enable a user to easily, effectively, and intuitively search for and/or browse through content available via a media content processing subsystem. In some examples, a user may access and navigate through any content available via the media content processing subsystem by using a single input button located on a user input device (e.g., a remote control) that is configured to communicate with (e.g., transmit command signals to) the media content processing subsystem. In this manner, an intuitive and efficient navigational experience may be provided for a user of the media content processing subsystem.

In some examples, a media content processing subsystem, such as a set-top box ("STB"), is configured to enable a user thereof to navigate through a hierarchy of content levels and thereby create a navigation thread. Content levels and navigation threads will be described in more detail below. The media content processing subsystem may be configured to successively provide a series of interactive graphical user interfaces ("GUIs") including at least a first interactive GUI and an end interactive GUI to a display for presentation to a user, each in response to a transmission of the same input command and each corresponding to a particular level within a navigation thread.

Components and functions of exemplary content level navigation systems and methods will now be described in more detail.

Figure 1:
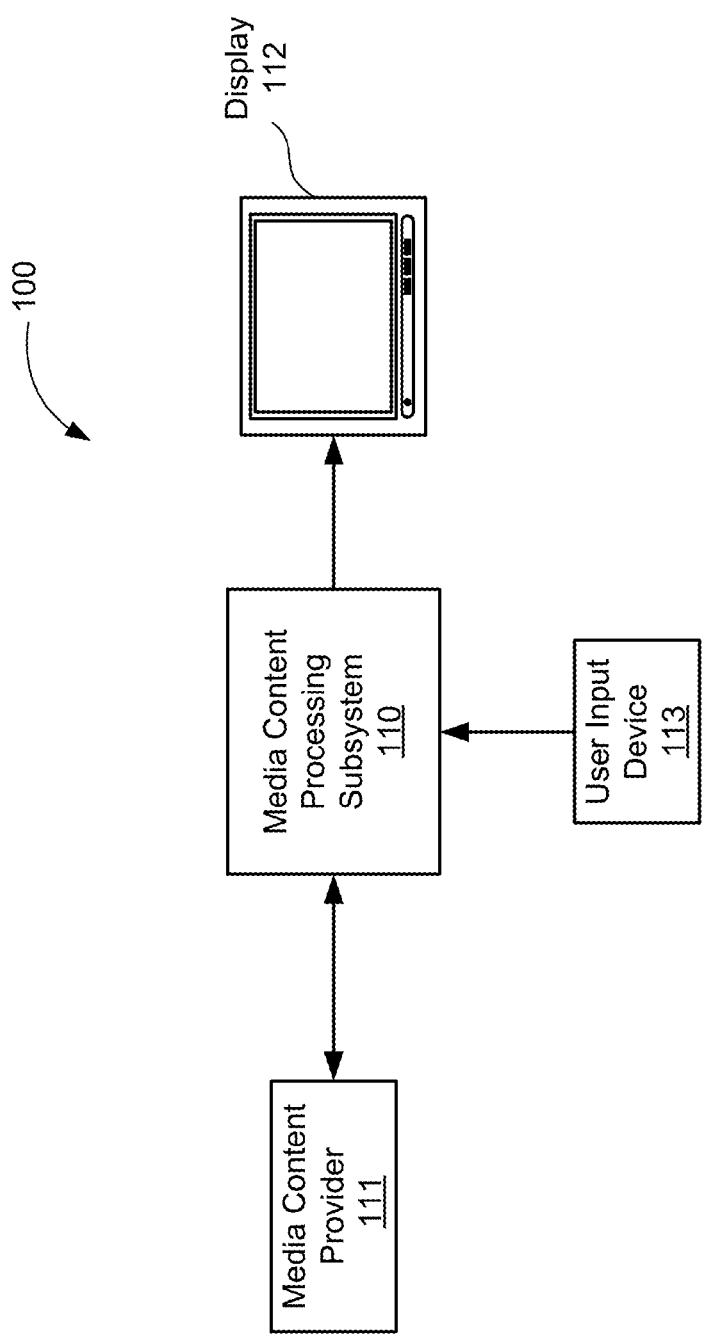
FIG. 1 illustrates an example of a media content access system according to principles described herein.

FIG. 1 illustrates an exemplary media content access system 100 (or simply "system 100"). As shown in FIG. 1, system 100 may include a media content processing subsystem 110, which may be configured to communicate with and receive a signal or data stream containing data representative of media content and/or data associated with media content from a media content provider 111. Media content processing subsystem 110 and media content provider 111 may communicate using any known communication technologies, devices, networks, media, and protocols supportive of remote data communications, including, but not limited to, cable networks, subscriber television networks, satellite networks, the Internet, intranets, local area networks, wireless networks (e.g., Wi-Fi and/or mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications networks and technologies.

Media content processing subsystem 110 may be configured to process a media content stream provided by media content provider 111, including causing a media content instance, or one or more components (e.g., video and/or audio components) of a media content instance, to be presented for experiencing (e.g., viewing) by a user. Presentation of the media content instance may include, but is not limited to, displaying, playing back, or otherwise processing the media content instance, or one or more components of the media content instance, such that the media content instance may be experienced by the user. For example, media content processing subsystem 110 may provide one or more signals to a display 112 (e.g., a television, computer monitor, mobile phone, handheld device, etc.) so that the display 112 may present (e.g., display) media content for experiencing by the user.

As shown in FIG. 1, and as will be described in more detail below, media content processing subsystem 110 may be at least partially controlled by a user input device 113 (e.g., a remote control device). In certain examples, user input device 113 may include input mechanisms by which a user can utilize features and/or services provided by media content processing subsystem 110. For example, a user may utilize user input device 113 to navigate within various interactive GUIs that may be provided by media content processing subsystem 110.

While an exemplary media content access system 100 is shown in FIG. 1, the exemplary components illustrated in FIG. 1 are not intended to be limiting. Additional or alternative components and/or implementations may be used. Components of system 100 will now be described in additional detail.

Media content provider 111 may be configured to provide various types of media content and/or data associated with media content to media content processing subsystem 110 using any suitable communication technologies, including any of those disclosed herein. The media content may include one or more media content instances, or one or more segments of the media content instance(s). The term "media content instance" as used herein refers generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user.

Figure 2:
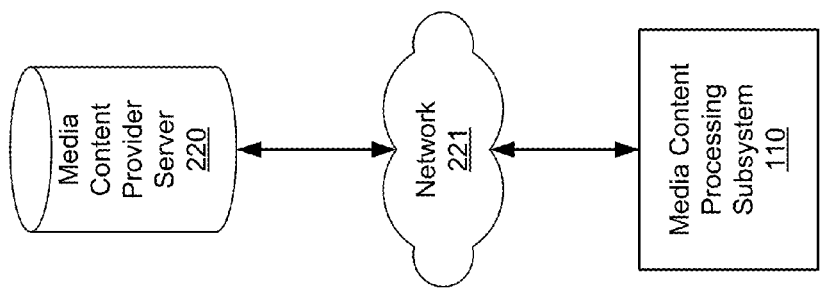
FIG. 2 illustrates an exemplary media content provider network according to principles described herein.

An exemplary media content provider 111 may include a media content provider server 220, as shown in FIG. 2. Media content provider server 220 may be configured to communicate with media content processing subsystem 110 via a network 221 (and communications links thereto). Network 221 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo network), an optical fiber network, any other suitable network, and any combination or sub-combination of these networks. In some alternative examples, media content processing subsystem 110 may be connected directly to media content provider server 220.

Figure 3:
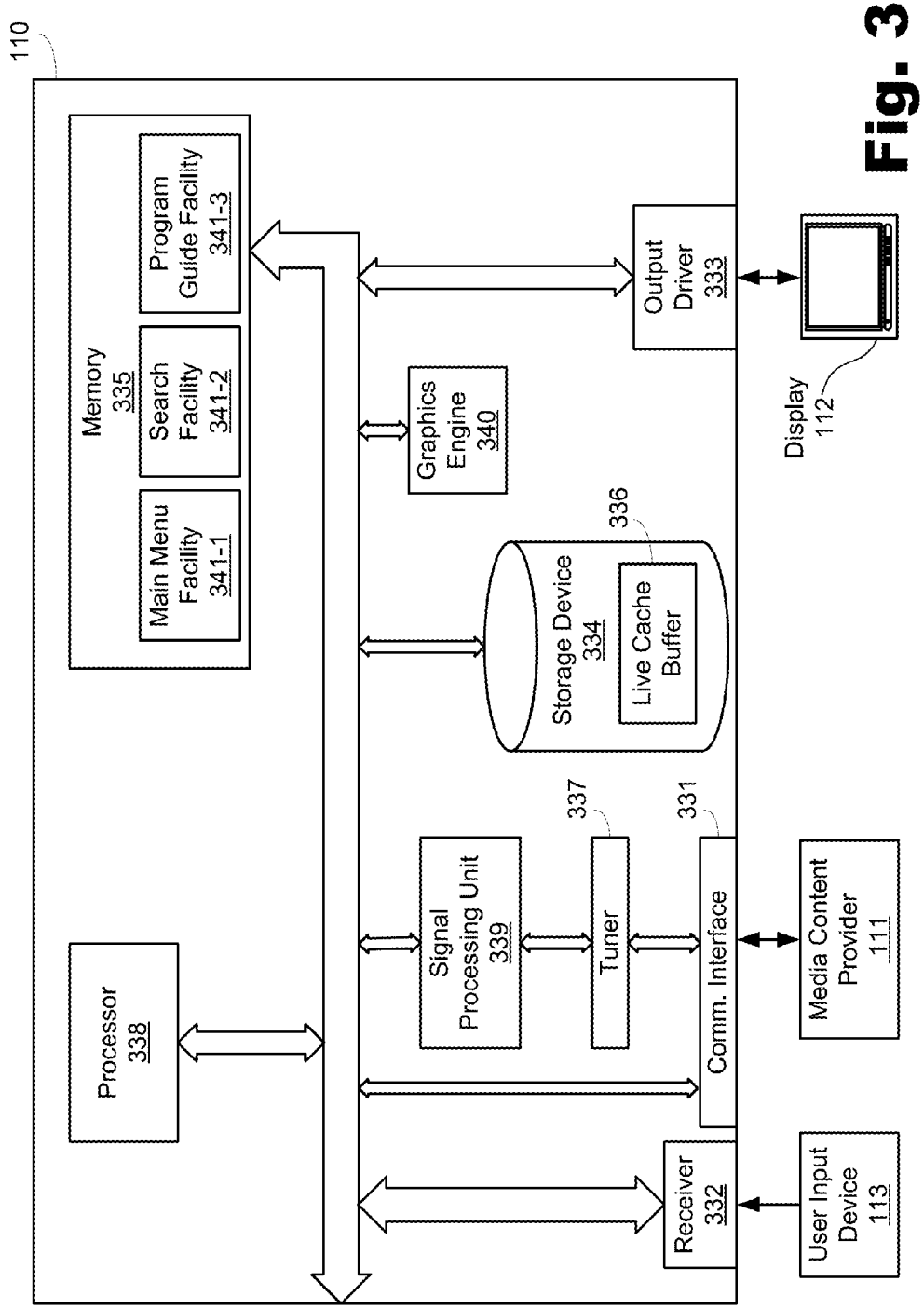
FIG. 3 illustrates an exemplary media content processing subsystem according to principles described herein.

FIG. 3 illustrates exemplary components of media content processing subsystem 110 (or simply "processing subsystem 110"). Processing subsystem 110 may include any hardware, software, and firmware, or combination or sub-combination thereof, configured to process media content and/or data associated with media content for presentation to a user. The media content and/or data associated with media content may be received from media content provider 111 and provided to display 112 for presentation to the user. As used herein and in the appended claims, unless otherwise specifically denoted, the terms "media content processing subsystem" and "processing subsystem" refer expansively to all possible receivers configured to receive and process digital and/or analog media content, as well as data associated with media content. Processing subsystem 110 may include, but is not limited to, a set-top box ("STB"), a home communication terminal ("HCT"), a digital home communication terminal ("DHCT"), a stand-alone personal video recorder ("PVR"), a DVD player, a handheld entertainment device, a gaming device, a video-enabled phone (e.g., a mobile phone), a wireless device, a touch screen device, and a personal computer.

In certain embodiments, processing subsystem 110 may include any computer hardware and/or instructions (e.g., software), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but by no means limited to, known versions and/or varieties of Microsoft Windows, UNIX, Macintosh, and Linux operating systems.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Additional or alternative components and/or implementations may be used in other embodiments. Components of the processing subsystem 110 will now be described in additional detail.

As shown in FIG. 3, processing subsystem 110 may include a communication interface 331 configured to receive content (e.g., media content) and/or data associated with media content (e.g., GUI data) in any acceptable format from media content provider 111 or from any other suitable content source. Communication interface 331 may include any device, logic, and/or other technologies suitable for receiving signals and/or data representative of media content and/or other types of content or data. Communication interface 331 may be configured to interface with any suitable communication media, protocols, and formats, including any of those mentioned above.

Processing subsystem 110 may also include a receiver 332 configured to receive user input signals (e.g., navigation input commands) from user input device 113. An exemplary user input device 113 will be described in more detail below.

Processing subsystem 110 may also include an output driver 333 configured to interface with or drive display 112. As instructed by one or more processors of the processing subsystem 110, output driver 333 may provide output signals to display 112, the output signals including content (e.g., media content and/or GUI content) to be presented by display 112 for experiencing by a user. For example, output driver 333 may provide one or more interactive GUIs to display 112 for presentation to the user. Output driver 333 may include any combination of hardware, software, and/or firmware as may serve a particular application.

Storage device 334 may include one or more data storage media, devices, or configurations and may employ any type, form, and combination of storage media. For example, storage device 334 may include, but is not limited to, a hard drive, network drive, flash drive, magnetic disc, optical disc, or other non-volatile storage unit. Media content, data associated with media content guide data, and/or other data may be temporarily and/or permanently stored in storage device 334.

Storage device 334 is shown to be a part of the processing subsystem 110 in FIG. 3 for illustrative purposes only. It will be understood that storage device 334 may additionally or alternatively be located external to processing subsystem 110.

Processing subsystem 110 may include memory 335. Memory 335 may include, but is not limited to, FLASH memory, random access memory ("RAM"), dynamic RAM ("DRAM"), other suitable computer-readable media, or any combination or sub-combination thereof. In some examples, various facilities or applications (e.g., facilities 341-1 through 341-3, collectively referred to herein as "facilities 341") used by the processing subsystem 110 may reside in memory 335.

Storage device 334 may include one or more live cache buffers 336. Live cache buffer 336 may additionally or alternatively reside in memory 335 or in a storage device external to processing subsystem 110. In some examples, media content and/or data associated with media content may be temporarily stored in live cache buffer 336 to facilitate viewing of the media content.

Tuner 337 may be configured to selectively receive content (e.g., media content) carried on a particular content channel. For example, tuner 337 may be tuned to a particular content channel such that the content carried on the content channel is received and processed by processing subsystem 110.

In some examples, processing subsystem 110 may include multiple tuners 337 such that content carried on different content channels may be concurrently received by the processing subsystem 110. For example, processing subsystem 110 may include a first tuner configured to receive content carried on an analog video signal and a second tuner configured to simultaneously receive content carried on a digital compressed signal.

In some examples, media content received at the tuner 337 is temporarily buffered, or stored, in the live cache buffer 336. If there are multiple tuners 337, there may be a live cache buffer 336 corresponding to each of the tuners 337.

While tuner 337 may be used to receive various types of content-carrying signals broadcast by media content provider 111, processing subsystem 110 may be configured to receive other types of content signals (including media content signals) from media content provider 111 and/or other sources without using a tuner. For example, media content provider 111 may broadcast digital streams of data packets (e.g., Internet Protocol ("IP") based data packets) that can be received without using a tuner. For such types of content signals, communication interface 331 may receive and forward the signals directly to other components of processing subsystem 110 (e.g., processor 338 or signal processing unit 339) without the signals going through tuner 337. For an IP-based signal, for example, signal processing unit 339 may function as an IP receiver.

Processing subsystem 110 may include at least one processor, such as processor 338, configured to control operations of processing subsystem 110. Processing subsystem 110 may also include a signal processing unit 339 configured to process incoming media content. Signal processing unit 339 may be configured, for example, to demodulate and parse encoded digital media content. In some examples, processing subsystem 110 may include one or more signal processing units 339 corresponding to each of the tuners 337. Data associated with media content that is received from the media content provider 111 may be processed by signal processing unit 339, processor 338, and/or any other suitable component(s) of processing subsystem 110.

Processing subsystem 110 may include a graphics engine 340 configured to generate graphics that can be displayed by the display 112. The graphics may include graphical user interfaces such as, but not limited to, one or more main menu, search, and/or program guide GUIs and/or any other graphics as may serve a particular application.

One or more facilities 341 (e.g., software applications) residing within processing subsystem 110 may be executed upon initiation by a user of the processing subsystem 110, or upon the occurrence of another predetermined event. The facilities may reside in memory 335 or in any other area of the processing subsystem 110 and be executed by processor 338.

As shown in FIG. 3, exemplary facilities 341 that may be included within processing subsystem 110 include a main menu facility 341-1, a search facility 341-2, and/or a program guide facility 341-3. Main menu facility 341-1 may be configured to instruct one or more components of processing subsystem 110 (e.g., processor 338 and/or graphics engine 340) to generate and provide data representative of a main menu GUI that facilitates access to one or more options, features, and/or media content instances via processing subsystem 110. Search facility 341-2 may be configured to instruct one or more components of processing subsystem 110 (e.g., processor 338 and/or graphics engine 340) to generate and provide one or more GUIs configured to enable a user to search for a particular media content instance and/or information related to one or more media content instances. Program guide facility 341-3 may be configured to instruct one or more components of processing subsystem 110 (e.g., processor 338 and/or graphics engine 340) to generate and provide data representative of a program guide GUI.

As mentioned, one or more operations of processing subsystem 110 may be controlled by user input device 113. User input device 113 may include a remote control, keyboard, or any other suitable input device and may be configured to communicate with receiver 332 via a wireless link (e.g., an infrared ("IR") or radio frequency ("RF") link), electrical connection, or any other suitable communication link.

Figure 4:
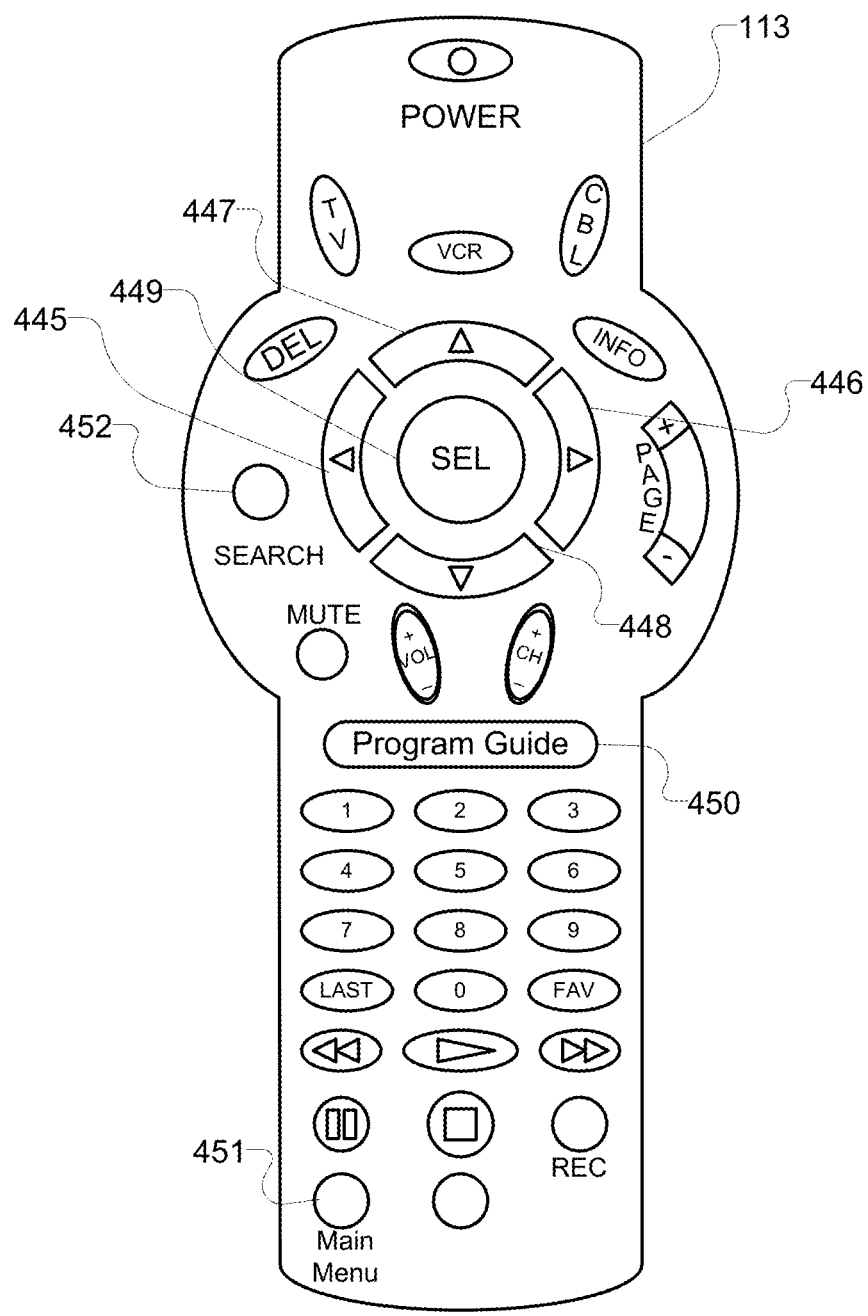
FIG. 4 illustrates an exemplary remote control user input device according to principles described herein.

An exemplary remote control user input device 113 is illustrated in FIG. 4. In some examples, input device 113 may be configured to enable a user to control viewing options for experiencing media content via processing subsystem 110. Navigation buttons (e.g., left button 445, right button 446, up button 447, and down button 448) and a select button 449 may be included and configured to enable the user to evoke and/or navigate through various views, options, and graphical user interfaces displayed by display 112. For example, buttons 445-449 may be configured to enable a user to utilize tools for navigating to different locations in a main menu, program guide, and/or search GUI. A program guide button 450 may be configured to evoke a presentation of a program guide GUI on display 112. A main menu button 451 may be configured to evoke the presentation of a main menu GUI on display 112. A search button 452 may be configured to evoke the presentation of a search GUI on display 112. It will be recognized that input device 113 shown in FIG. 4 is merely illustrative of the many different types of user input devices that may be used to in connection with processing subsystem 110.

Figure 5:
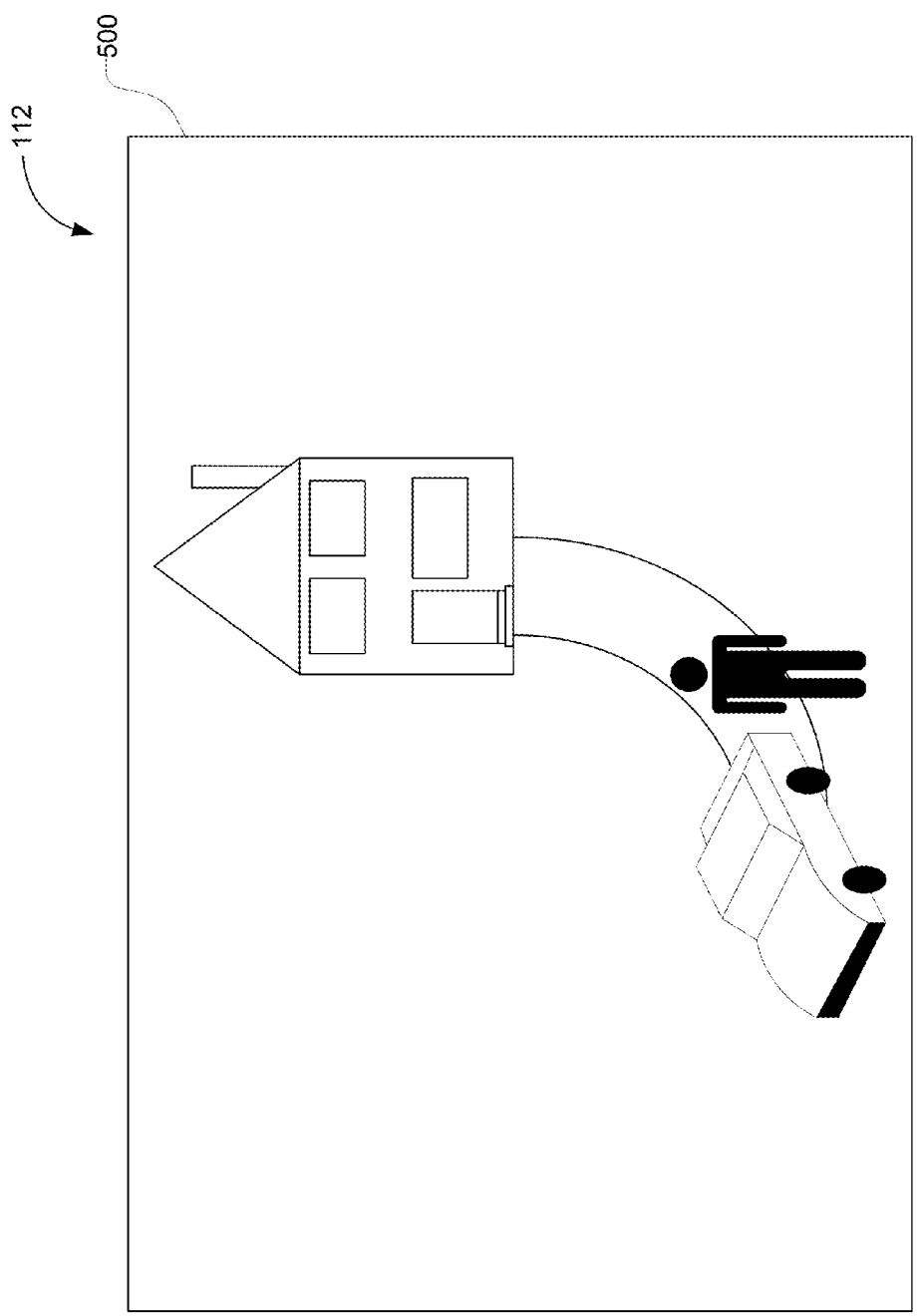
FIG. 5 illustrates a viewing area of an exemplary display device with a particular scene or frame of a media content instance displayed thereon according to principles described herein.

FIG. 5 illustrates a viewing area or screen 500 of an exemplary display device 112 with a particular scene or frame of a media content instance displayed thereon. In some examples, the user may be interested in experiencing a different media content instance and/or viewing information related to one or more other media content instances. The user may additionally or alternatively be interested in accessing various settings, communication mediums, purchasing venues, and/or any other option or feature of the media content processing subsystem 110.

However, there may be a relatively large number (e.g., thousands) of media content instances and/or options available via processing subsystem 110. To this end, various GUIs configured to allow a user to easily and intuitively access, search, and/or browse through any content available via processing subsystem 110 may be provided to display 112 by processing subsystem 110 for presentation to a user.

In some examples, and as will be illustrated in more detail below, a user may access a particular media content instance and/or options associated therewith by navigating or "drilling down" through a hierarchy of content levels (or simply "levels"). As the user navigates through a series of content levels, a "navigation thread" is created.

In some examples, a content level may correspond to a particular directory or folder of content. As used herein, the terms "directory" and "folder" refer interchangeably to a grouping of one or more related options, features, media content instances, and/or other content utilizing some form of a hierarchical representation. A content level may additionally or alternatively refer to a particular stage within a navigation thread.

Figure 6:
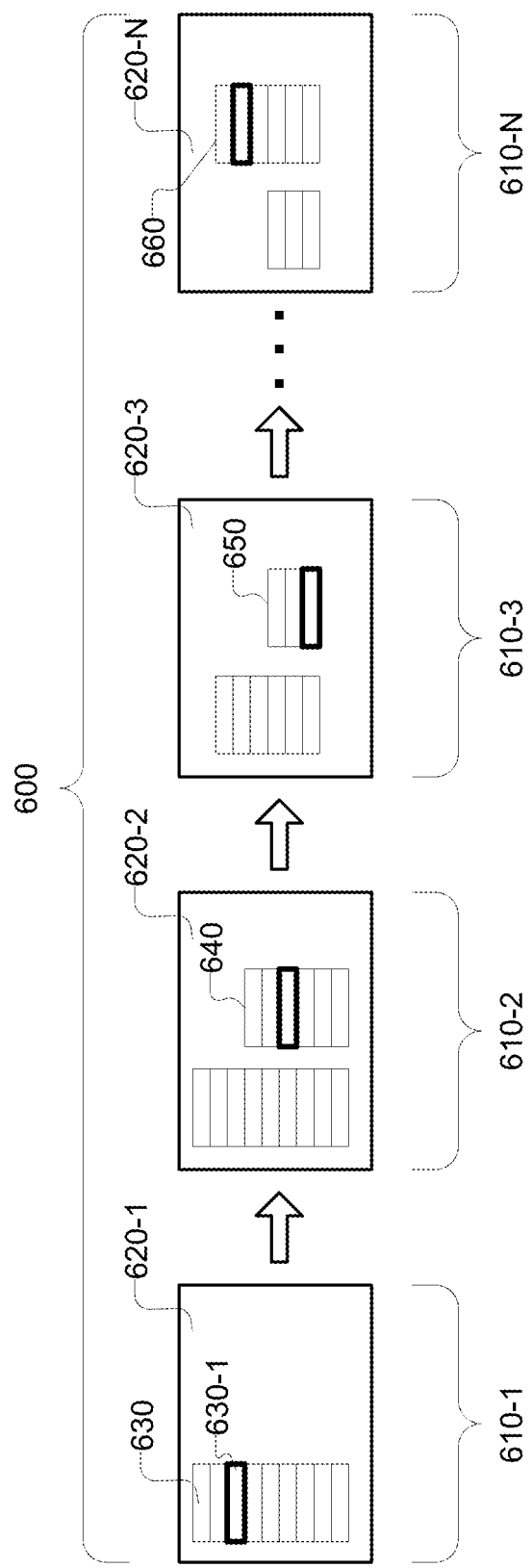
FIG. 6 is a graphical representation of an exemplary navigation thread according to principles described herein.

FIG. 6 is a graphical representation of an exemplary navigation thread 600. As shown in FIG. 6, navigation thread 600 may include a series of content levels (e.g., 610-1 through 610-N, collectively referred to as 610). Each level 610 represents a particular directory or stage within navigation thread 600 and corresponds to a distinct interactive GUI (e.g., 620-1 through 620-N, collectively referred to as 620) presented by processing subsystem 110. Each level 610 may be created or accessed by selecting an entry, option, graphic, or other feature presented within one of the interactive GUIs with user input device 113.

To illustrate, a first interactive GUI 620-1 corresponding to a first level 610-1 within navigation thread 600 may first be presented by processing subsystem 110. Interactive GUI 620-1 may include one or more selectable entries 630. As used herein, an "entry" within an interactive GUI includes any entry, option, selectable graphic, or other feature presented within the interactive GUI that may be selected by a user initiating transmission of an input command from the user input device 113 to processing subsystem 110. Exemplary entries within an interactive GUI will be described in more detail below.

In response to a selection of one of the entries 630 presented in the first interactive GUI 620-1 (e.g., entry 630-1), a second level 610-2 within navigation thread 600 is created. As shown in FIG. 6, a second interactive GUI 620-2 is presented by processing subsystem 110 within the second level 610-2. The second interactive GUI 620-2 may include one or more selectable entries 640 corresponding to selected entry 630-1.

Additional levels 610 (e.g., third level 610-3, etc.), interactive GUIs (e.g., third interactive GUI 620-3, etc.), and entries (e.g., entries 650, etc.) may be similarly created within navigation thread 600 until an end level 610-N within navigation thread 600 is created. As shown in FIG. 6, an end interactive GUI 620-N corresponding to end level 610-N may be presented by processing subsystem 110. End interactive GUI 620-N may include one or more entries 660 associated with an end point of navigation thread 600. For example, the selectable entries 660 may include the names of one or more media content instances that, when selected, cause processing subsystem 110 to perform an action (e.g., play, record, purchase, etc.) associated with the media content instances. Exemplary entries that may be included within an end level 610-N will be described in more detail below.

In some examples, each time a user desires to select a particular entry within a particular interactive GUI 620 and thereby create another level 610 within navigation thread 600, the user may initiate transmission of the same input command to processing subsystem 100 with user input device 113. The input command may be transmitted by selecting one of the buttons that are a part of the user input device 113. To illustrate, the input command may be transmitted in response to the user selecting the right navigation button 446 of user input device 113. In this example, each time the user presses the right navigation button 446, an entry is selected and another level 610 within navigation thread 600 is created. In this manner, a user may "drill down" through levels 610 of navigational thread 600 using the same input command. As will be illustrated in more detail below, the use of a single input button (e.g., the right navigation button 446) to select entries and successively create or access multiple levels 610 within a navigation thread 600 may provide an intuitive and efficient navigational experience for a user of processing subsystem 110.

Examples of various navigation threads will now be described in connection with FIGS. 7-15. It will be recognized that the navigation threads described herein are merely illustrative and that they may vary as may serve a particular application.

Figure 7:
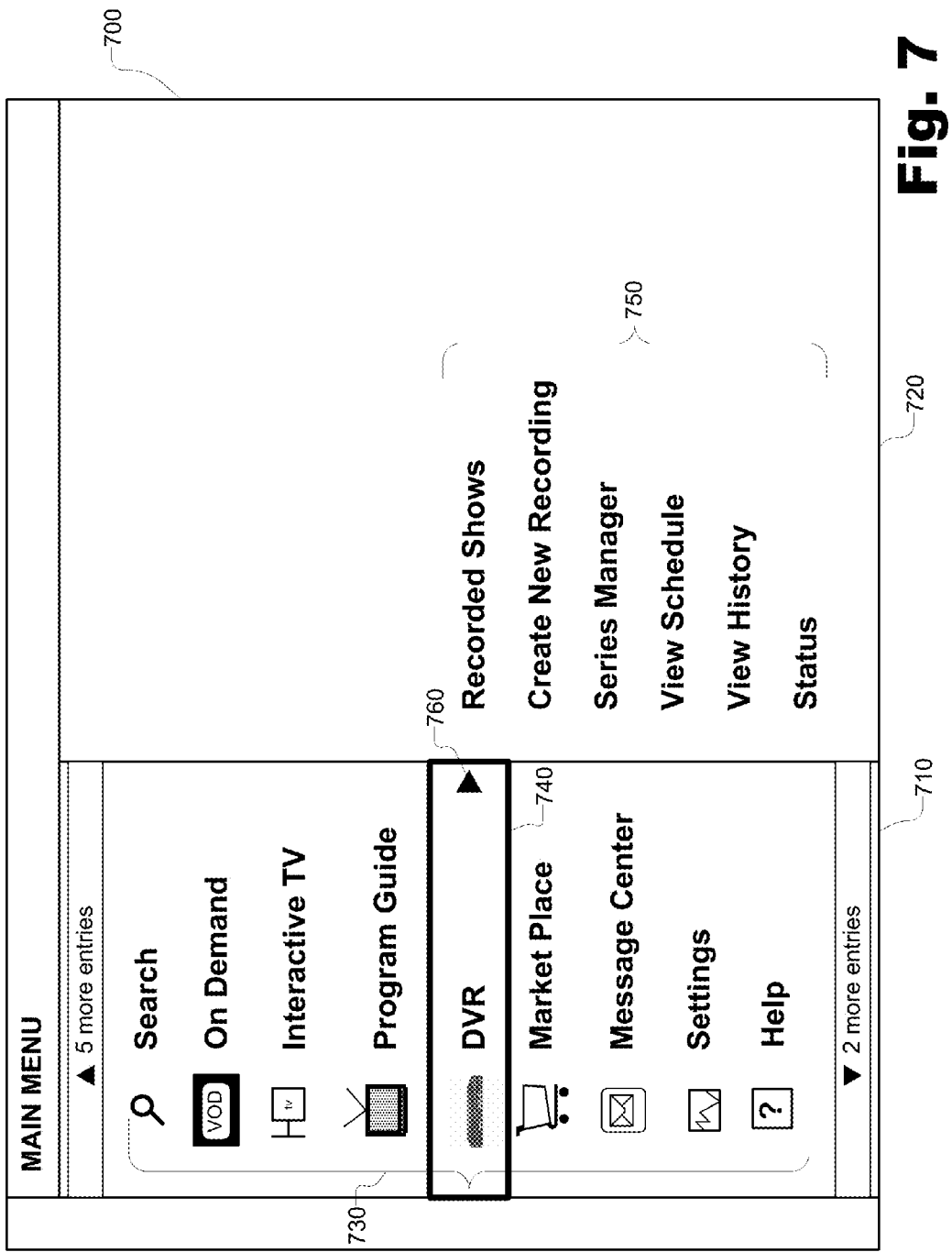
FIG. 7 illustrates an exemplary main menu graphical user interface ("GUI") corresponding to a first level within a navigation thread according to principles described herein.

An exemplary navigation thread may be created by navigating through and selecting various options presented within a main menu GUI. FIG. 7 illustrates an exemplary main menu GUI 700 that may be presented by processing subsystem 110 and that may correspond to a first level within a navigation thread. Main menu GUI 700 may be evoked using a number of different methods. For example, the user may select a dedicated button on a user input device (e.g., main menu button 451 on user input device 113). Additionally or alternatively, main menu GUI 700 may be evoked by the user selecting an option within any other GUI as may serve a particular application.

As shown in FIG. 7, main menu GUI 700 may include two interactive viewing panes, labeled 710 and 720 respectively. It will be recognized that main menu GUI 700 may alternatively include any other number of viewing panes as may serve a particular application. In some examples, as will be described in more detail below, the contents of second viewing pane 720 may be dynamically updated to display various entries related to a selected entry within first viewing pane 710.

As shown in FIG. 7, first viewing pane 710 may include a main menu listing 730 of selectable entries. Each entry within main menu listing 730 corresponds to a directory of one or more other options that may be accessed via processing subsystem 110. For example, main menu listing 730 may include entries configured to allow access to one or more of the following options or features: calendar options, search options, on demand programming options, interactive television options, program guide listings, DVR options, shopping options, messaging and communication options, settings, and help options. It will be recognized that main menu listing 730 may include additional or alternative entries as may serve a particular application. For example, one or more customized entries may be included within main menu listing 730 such as, but not limited to, a directory containing personalized media content (e.g., photos, music, videos, games, and contacts).

In some examples, a user may navigate through main menu listing 730 with the up and down navigation buttons 447 and 448, for example, and select a desired entry by pressing a designated selection button (e.g., right navigation button 446) when the desired entry is located within a "magnified area." As used herein, the term "magnified area" 740 will be used to refer to a fixed focus state or area within a viewing pane (e.g., first viewing pane 710) that is in some way distinguished from the rest of viewing pane 710. For example, as shown in FIG. 7, magnified area 740 is surrounded by a distinguishing border. The magnified area 740 may additionally or alternatively include a distinct color, brightness, text size, and/or any other distinguishing feature.

The magnified area 740 may be configured to remain stationary in relation to the scrolling main menu listing 730. Hence, as a user scrolls up or down through main menu listing 730 of selectable entries, the entry directly above or below magnified area 740 moves into magnified area 740.

As shown in FIG. 7, a filtered view of content related to the entry that is located within magnified area 740 may be displayed within second viewing pane 720. For example, a content list 750 containing one or more selectable entries that are related to the entry that is located within magnified area 740 may be displayed within second viewing pane 720. To illustrate, FIG. 7 shows a content list 750 related to the "DVR" entry that is located within magnified area 740.

In this manner, second viewing pane 720 is configured to display a "preview" of content related to a particular entry located within magnified area 740 before the entry is selected by the user. It will be recognized that the filtered view displayed within second viewing pane 720 may alternatively include other types of content.

A user may select a desired entry within main menu listing 730 by pressing a designated selection button (e.g., right navigation button 446) when the desired entry is located within magnified area 740. A graphical object 760 may be displayed next to the entry to graphically indicate to the user that the entry may be selected by pressing the designed selection button. For example, graphical object 760 may be in the form of a right arrow to indicate that the right navigation button 446 may be pressed to select a particular entry within magnified area 740. It will be recognized that graphical object 760 may include any type of graphic as may serve a particular application.

When an entry within main menu listing 730 is selected, another level within the navigation thread is created and the content list 750 related to the selected entry is transferred from second viewing pane 720 to first viewing pane 710. A new filtered view may also be displayed within second viewing pane 720. The new filtered view may include a content list that is related to one of the entries within content list 750.

Figure 8:
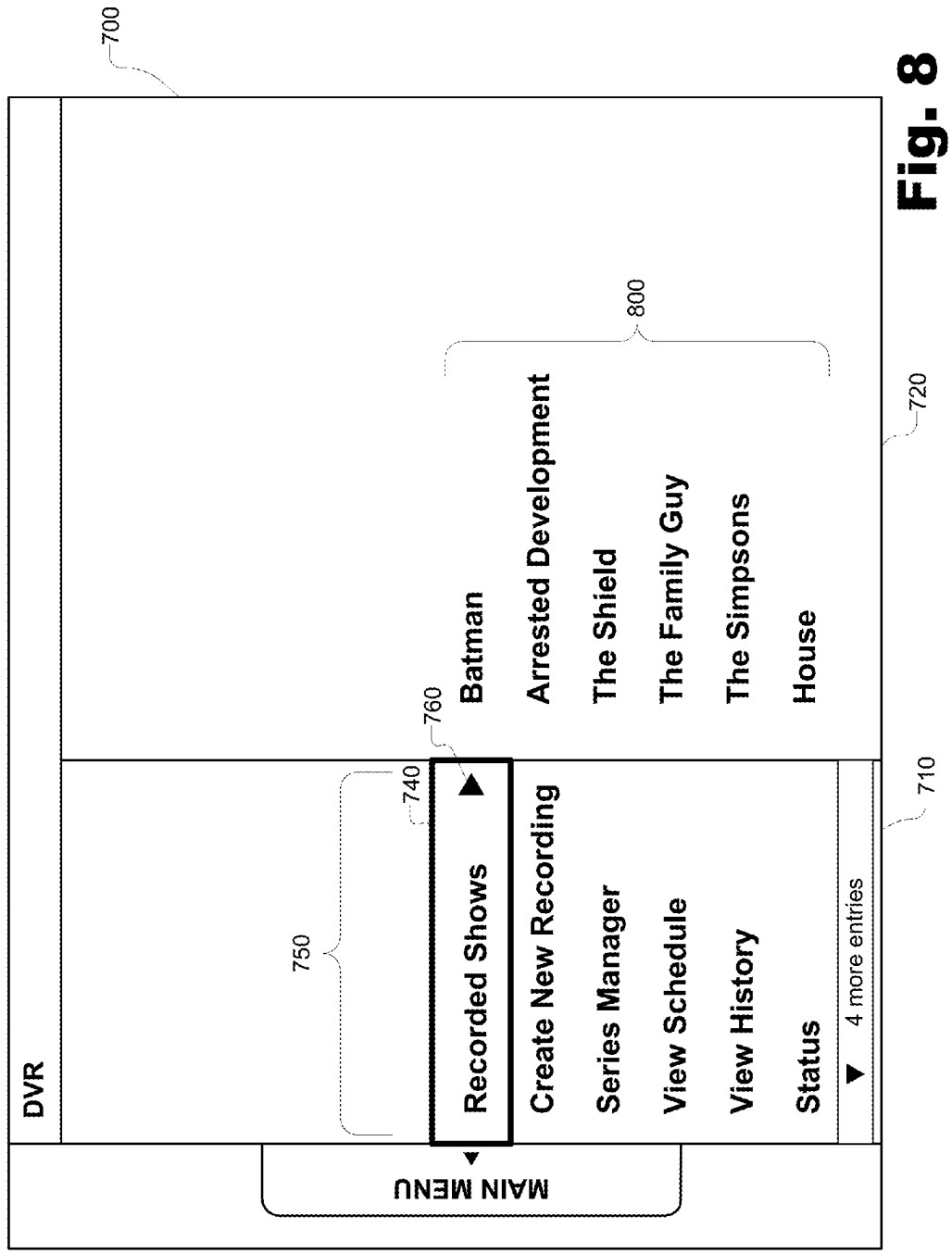
FIG. 8 shows an exemplary GUI corresponding to a second level within the navigation thread started in FIG. 7 according to principles described herein.

For example, FIG. 8 shows an updated view of main menu GUI 700 after the "DVR" entry within main menu listing 730 has been selected. As shown in FIG. 8, content list 750 has been transferred to first viewing pane 710. A user may then use the up and down navigation buttons 447 and 448 to browse through content list 750.

When a particular entry enters magnified area 740, a filtered view of content associated with that entry appears in second viewing pane 720 in a manner similar to that already described in connection with main menu listing 730. For example, FIG. 8 shows that an entry labeled "Recorded Shows" is located within magnified area 740, and a content list 800 containing a number of entries related to the "Recorded Shows" entry is displayed within second viewing pane 720. Content list 800 may include, as shown in FIG. 8, a number of television shows that have been recorded by the user.

To select one of the entries within content list 750 and thereby create another level within the navigation thread, the user may again press the designated selection button (e.g., right navigation button 446) to transmit an input command to processing subsystem 110 when the desired entry is located within magnified area 740. For example, graphical object 760 shown in FIG. 8 indicates that the "Recorded Shows" entry may be selected by pressing the designated selection button.

Figure 9:
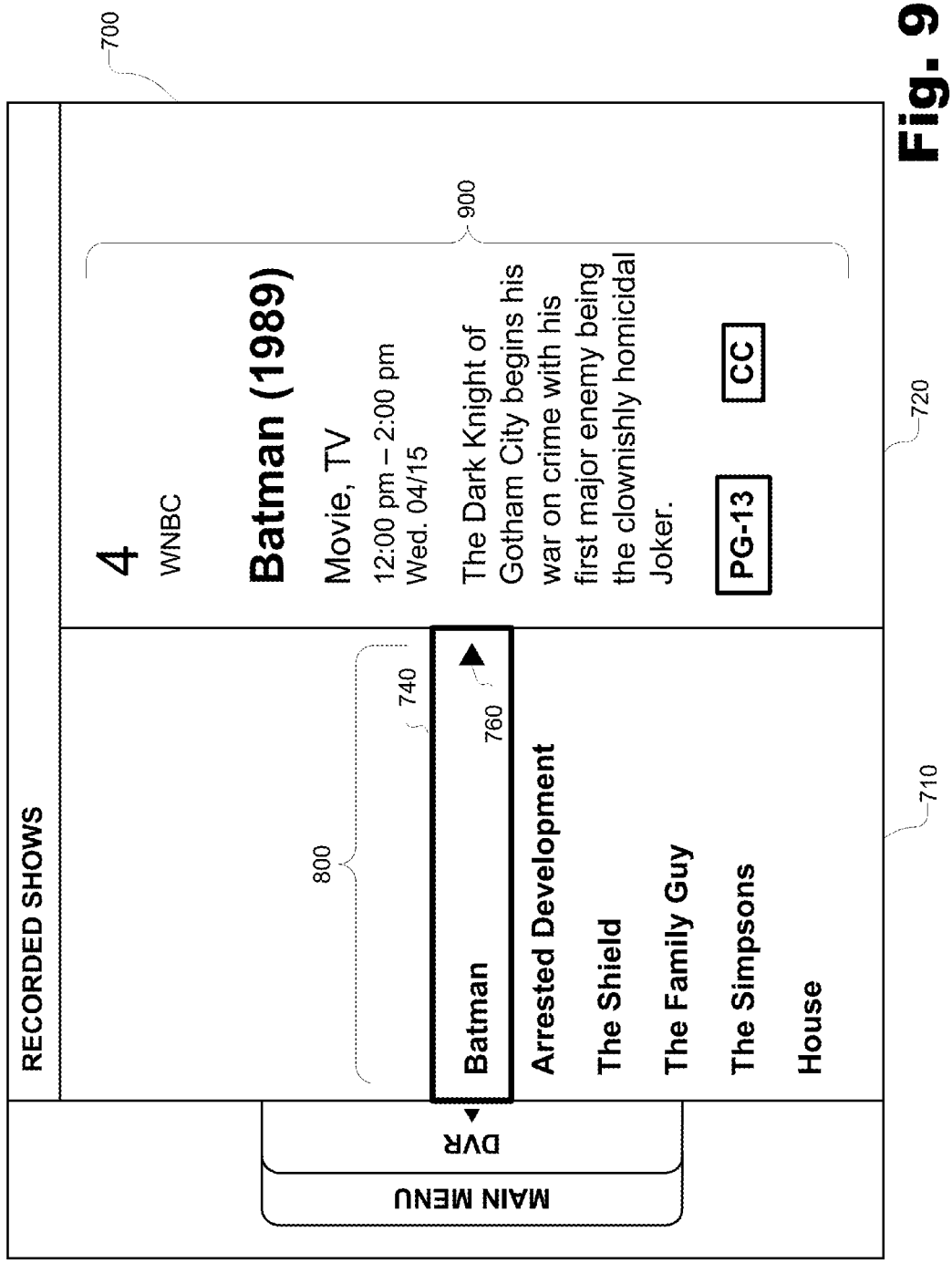
FIG. 9 shows an exemplary GUI corresponding to an end level within the navigation thread started in FIG. 7 according to principles described herein.

FIG. 9 shows an updated view of main menu GUI 700 after the "Recorded Shows" entry has been selected and after another level within the navigation thread has been created. As shown in FIG. 9, content list 800 has been transferred to first viewing pane 710. Second viewing pane 720 may then display program information corresponding to an entry that is located within magnified area 740. For example, second viewing pane 720 illustrated in FIG. 9 shows program information 900 corresponding to "Batman," which entry is located within magnified area 740.

The GUI shown in FIG. 9 may be an end GUI corresponding to an end level of the navigation thread. As shown in FIG. 9, for example, at least one of the entries within content list 800 corresponds to a particular media content instance. As will be described in more detail below, if one of these entries is selected (e.g., by actuation of the designated selection button), processing subsystem 110 may be configured to perform an action associated with the selected entry instead of creating another level within navigation thread. Hence, the GUI shown in FIG. 9 is an end GUI corresponding to an end level within the navigation thread.

In some examples, as indicated by graphical object 760, an entry within content list 800 may be selected by pressing the designated selection button to transmit an input command to processing subsystem 110. In response to the transmitted input command, processing subsystem 110 may perform an action associated with the selected entry.

To illustrate, if the user selects the "Batman" entry by pressing right navigation button 446, processing subsystem 110 may be configured to automatically play the media content instance labeled "Batman." Processing subsystem 110 may additionally or alternatively perform any other action associated with the selected entry as may serve a particular application. For example, processing subsystem 110 may be configured to record, purchase, and/or otherwise process the selected entry in response to the transmitted input command.

Figure 10:
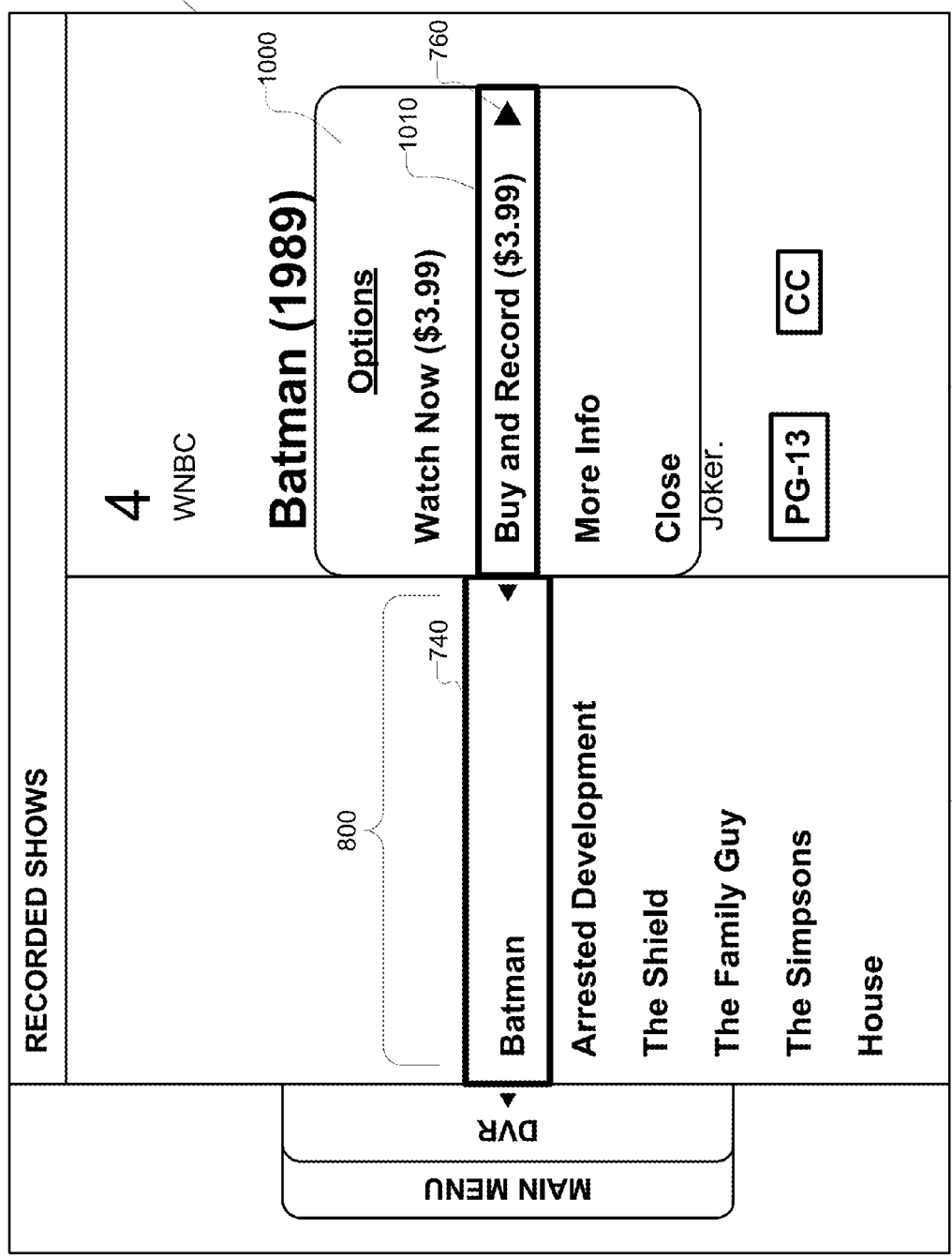
FIG. 10 illustrates an exemplary contextual pop-up window that may be displayed when an entry within an end GUI is selected according to principles described herein.

In some examples, processing subsystem 110 may be configured to present a contextual pop-up window including actionable options that correspond to the selected entry in an end GUI. FIG. 10 illustrates an exemplary contextual pop-up window 1000 that may be displayed when an entry within an end GUI is selected. As shown in FIG. 10, contextual pop-up window 1000 may be at least partially superimposed over the first and/or second viewing panes 710 and 720. Alternatively, contextual pop-up window may be displayed in any other manner as may serve a particular application.

As shown in FIG. 10, contextual pop-up window 1000 may include one or more actionable options corresponding to the selected entry. For example, contextual pop-up window 1000 may include an option to watch, buy, and/or record the selected entry. It will be recognized that additional or alternative actionable options may be displayed within contextual pop-up window 1000 as may serve a particular application. In some examples, the options presented within contextual pop-up window 1000 may be dependent on the particular entry that is selected. For example, if a particular media content instance has already been recorded, the record option may be omitted from contextual pop-up window 1000.

To select one of the actionable options within contextual pop-up window 1000, a user may scroll through the list and again press the designated selection button (e.g., right navigation button 446) when the desired option is located within magnified area 1010. In other embodiments, another button (e.g., select button 449) may be pressed to select the desired option as may serve a particular application.

Another exemplary navigation thread may be created by using one or more search GUIs to locate a particular media content instance. To search for one or more media content instances, a user may select the "Search" entry shown in main menu GUI 700 of FIG. 7. Alternatively, the user may press the search button 452 on the user input device 113 or any other button as may serve a particular application.

Figure 11:
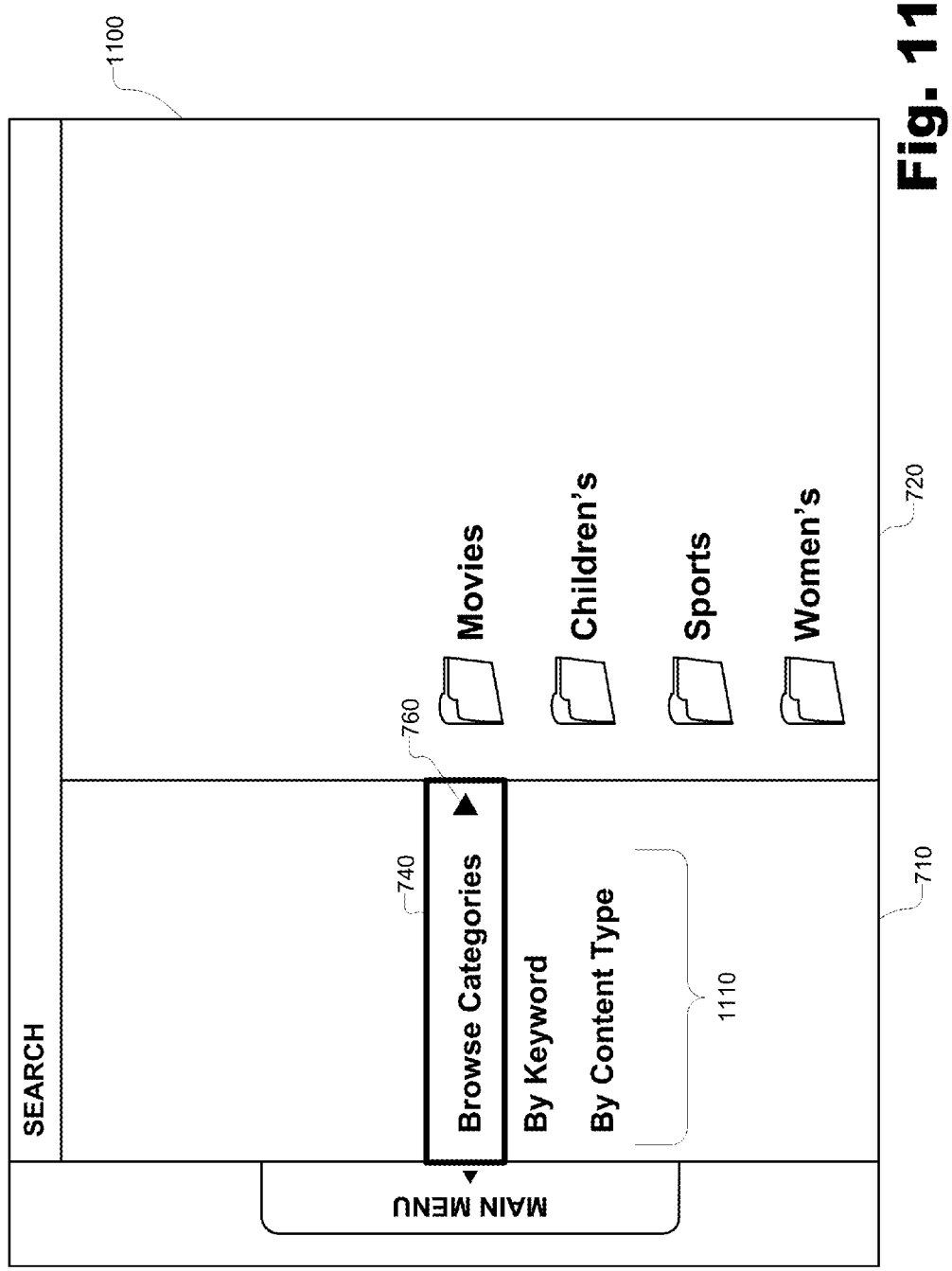
FIG. 11 shows an exemplary search GUI according to principles described herein.

FIG. 11 shows an exemplary search GUI 1100, which may be presented in response to the user selecting the "Search" entry from the main menu GUI 700 of FIG. 7 or by pressing the search button 452 on the user input device 113, for example. As shown in FIG. 11, a list 1110 of various search options may be displayed in the first viewing pane 710. A user may search by category, keyword, content type, and/or any other criteria as may serve a particular example.

To search by category, for example, the user may press the designated selection button (e.g., right navigation button 446) when the "Browse Categories" entry is located within magnified area 740. In response, processing subsystem 110 creates another level within the navigation thread and displays an updated GUI.

Figure 12:
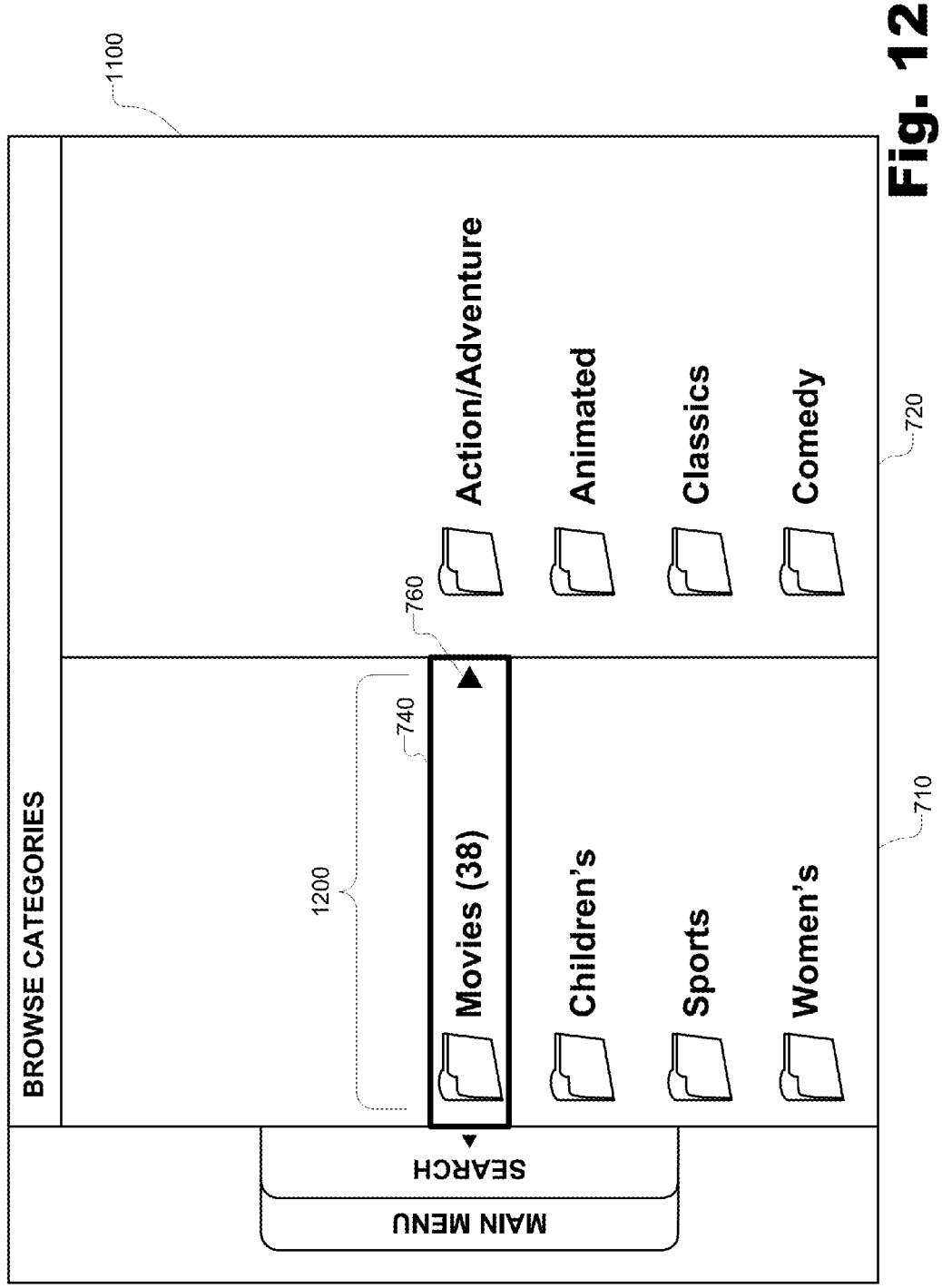
FIG. 12 shows an updated search GUI after a particular entry within the search GUI of FIG. 11 has been selected according to principles described herein.

FIG. 12 shows an updated search GUI 1100 after the "Browse Categories" entry has been selected. As shown in FIG. 12, a list of categories 1200 is displayed within first viewing pane 710. The list of categories 1200 may include any suitable category such as, but not limited to, movies, children's content, sports content, and women's content.

The user may select one of the categories within the list of categories 1200 to continue searching for media content contained therein. For example, to search within the "movies" category, the user may press the designated selection button (e.g., right navigation button 446) while the "movies" entry is located within magnified area 740. In response, processing subsystem 110 creates another level within the navigation thread and displays an updated GUI.

Figure 13:
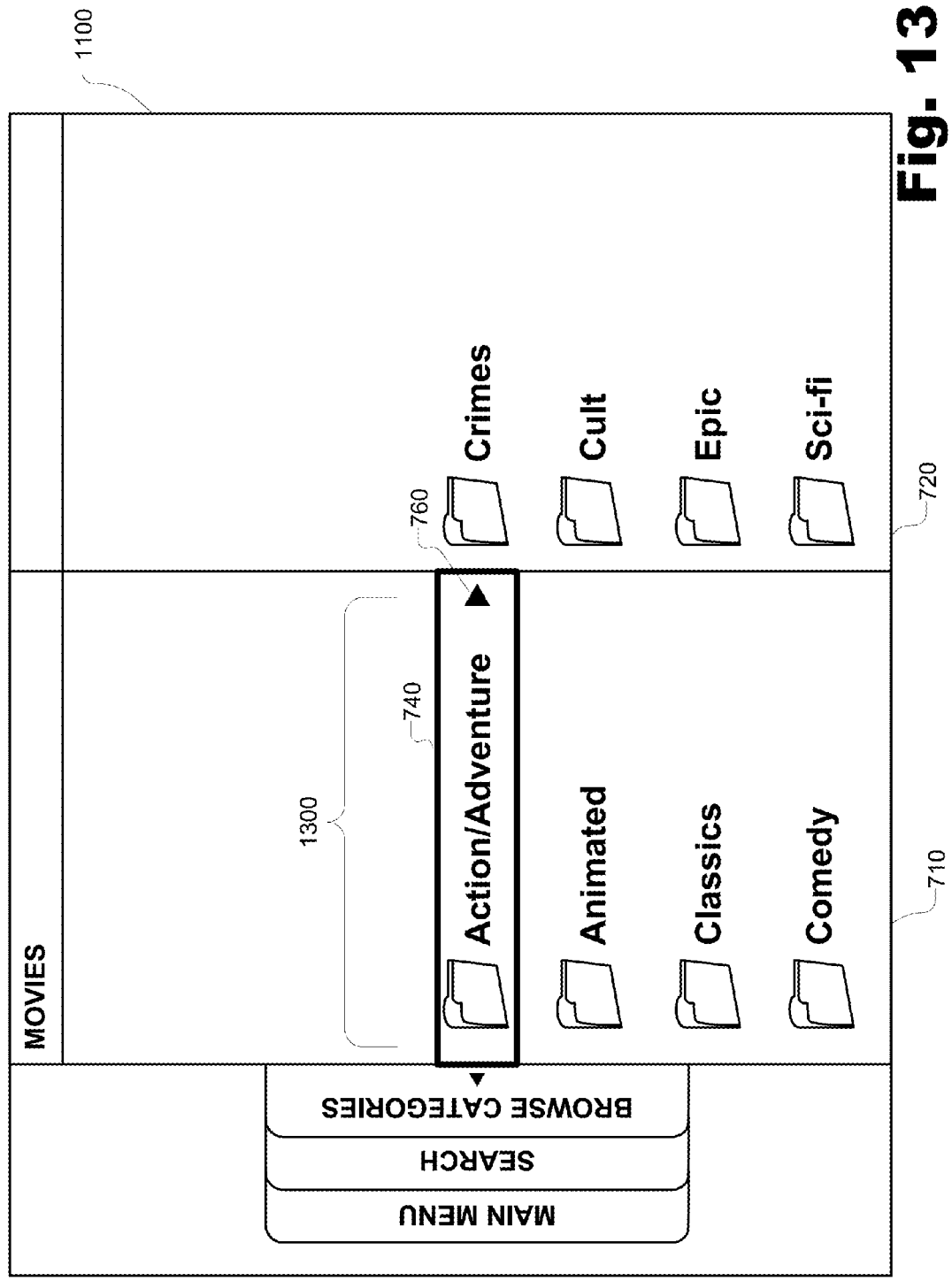
FIG. 13 shows another updated search GUI after a particular entry within the GUI of FIG. 12 has been selected according to principles described herein.

FIG. 13 shows an updated search GUI 1100 after the "movies" entry has been selected. As shown in FIG. 13, a list of categories 1300 related to the "movies" entry is displayed within first viewing pane 710. The user may continue to search through various levels of movies in a manner similar to that described previously until a desired media content instance is located.

Figure 14:
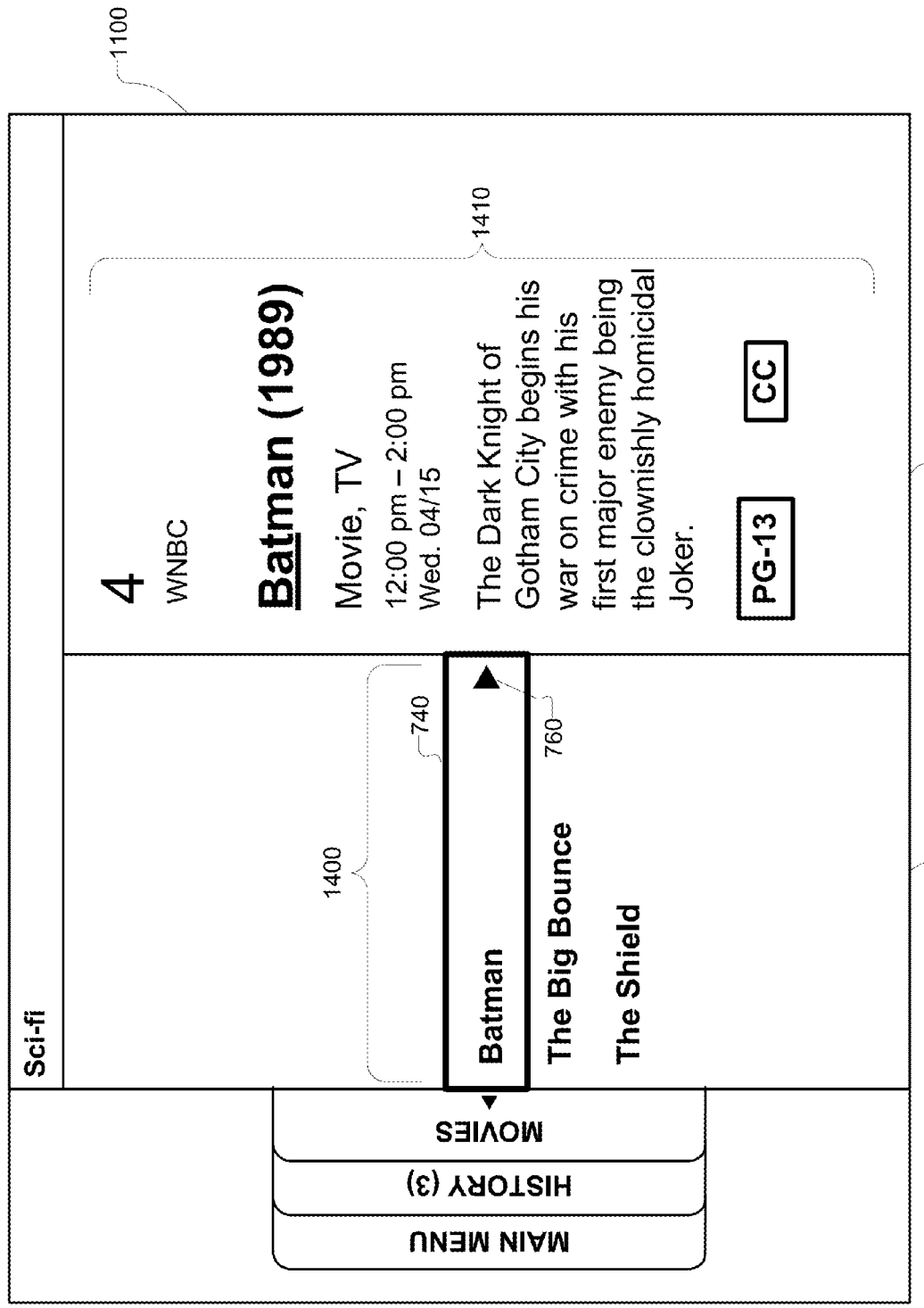
FIG. 14 shows another updated search GUI that corresponds to an end level of a navigation thread after a particular entry within the search GUI of FIG. 13 has been selected according to principles described herein.

For example, FIG. 14 shows an updated search GUI 1100 that corresponds to an end level within the navigation thread after the user has searched through various categories and located a number of media content instances. As shown in FIG. 14, a list 1400 of the media content instances is displayed within first viewing pane 710. The second viewing pane 720 displays program information 1410 corresponding to the media content instance "Batman."

In some examples, as indicated by graphical object 760, an entry within list 1400 may be selected by pressing the designated selection button to transmit an input command to processing subsystem 110. In response to the transmitted input command, processing subsystem 110 may perform an action associated with the selected entry.

To illustrate, if the user selects the "Batman" entry by pressing the right navigation button 446, processing subsystem 110 may be configured to automatically play the media content instance labeled "Batman." Processing subsystem 110 may additionally or alternatively perform any other action associated with the selected entry as may serve a particular application. For example, processing subsystem 110 may be configured to record, purchase, and/or otherwise process the selected entry in response to the transmitted input command.

Figure 15:
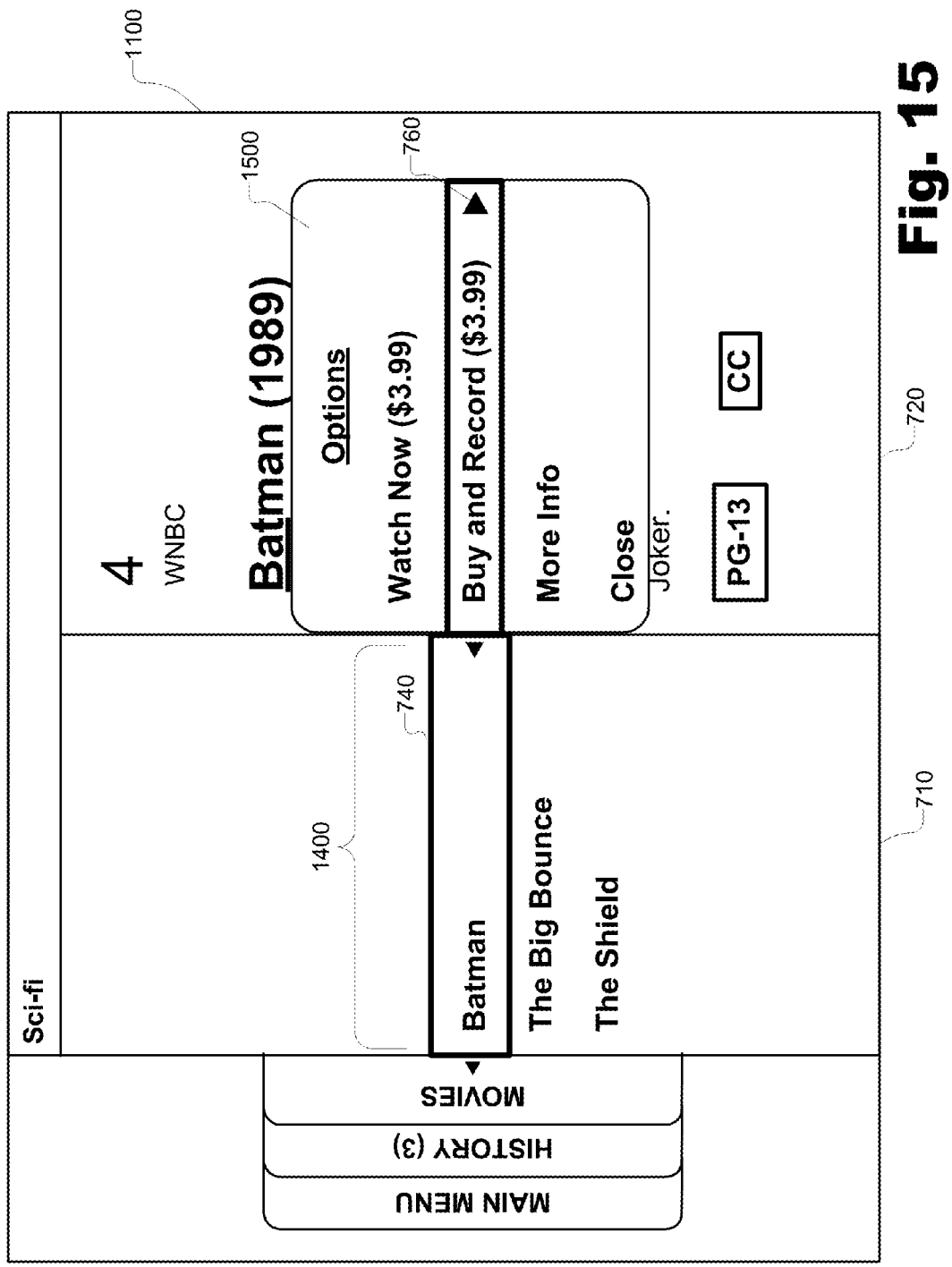
FIG. 15 illustrates an exemplary contextual pop-up window that may be displayed after a particular entry has been selected from the GUI of FIG. 14 according to principles described herein.

Processing subsystem 110 may alternatively be configured to present a contextual pop-up window with actionable options corresponding to the selected entry displayed therein. FIG. 15 illustrates an exemplary contextual pop-up window 1500 that may be displayed after the "Batman" entry has been selected. As shown in FIG. 15, contextual pop-up window 1500 may be similar to contextual pop-up window 1000 described in connection with FIG. 10.

FIG. 16 illustrates an exemplary method of navigating through content levels within a navigation thread. While FIG. 16 illustrates exemplary steps according to one embodiment, other embodiments may omit, add to, reorder, and/or modify any of the steps shown in FIG. 16.

In step 1600, a first interactive GUI is provided to a display for presentation to a user in response to a transmission of an input command. Step 1600 may be performed in any of the ways described herein, including media content processing subsystem 110 providing the first interactive GUI to display 112. The first interactive GUI corresponds to a first content level within a navigation thread and may include any type of GUI as may serve a particular application. The input command may be transmitted in any of the ways described herein, including the user input device 113 transmitting the input command to the media content processing subsystem 110 in response to the user selecting or pressing a designated selection button (e.g., right navigation button 446).

In step 1610, an end interactive GUI is provided to the display for presentation to the user in response to a repeat transmission of the input command. Step 1610 may be performed in any of the ways described herein, including media content processing subsystem 110 providing the end interactive GUI to display 112. The end interactive GUI corresponds to an end content level within the navigation thread and may include one or more selectable entries as described herein. The repeat transmission of the input command may include transmission of the same input command that was transmitted in step 1600. For example, the repeat transmission of the input command may include the user input device 113 transmitting the input command to the media content processing subsystem 110 again in response to the user selecting or pressing the designated selection button. It will be recognized that additional interactive GUIs corresponding to additional levels between the first and end levels may be provided as may serve a particular application.

In step 1620, an action corresponding to a selected entry within the end GUI is performed in response to another repeat transmission of the input command. The media content processing subsystem 110 may be configured to perform the action as described herein. For example, media content processing subsystem 110 may be configured to play, record, or purchase a selected media content instance. Additionally or alternatively, media content processing subsystem 110 may be configured to present a contextual pop-up window with one or more options associated with the selected entry.

The repeat transmission of the input command may include transmission of the same input command transmitted in steps 1600 and 1610. For example, the repeat transmission of the input command may include the user input device 113 transmitting the input command to the media content processing subsystem 110 yet again in response to the user selecting or pressing the designated selection button.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a media content processing subsystem comprising at least one processor and configured to
      provide a first interactive graphical user interface to a display for presentation to a user in response to a transmission of an input command generated in response to a first actuation of a single navigation button that is part of a user input device, the first interactive graphical user interface corresponding to a first content level or an intermediate content level within a navigation thread, the first interactive graphical user interface comprising:
         a first menu in a first region of the display, the first menu including selectable entries, and
         a content listing in a second region of the display, the content listing showing a preview of content items related to at least one of the selectable entries of the first menu,
      provide an end interactive graphical user interface to the display for presentation to the user in response to a repeat transmission of the input command generated in response to a second actuation of the single navigation button, the end interactive graphical user interface corresponding to an end content level within the navigation thread, the end interactive graphical user interface comprising:
         a second menu provided in place of the first menu in the first region of the display, the second menu including selectable entries corresponding to the content items shown in the content listing in the second region of the first interactive graphical user interface, and
         a third menu provided in place of the content listing in the second region of the display, the third menu including selectable entries related to at least one of the selectable entries of the second menu, the third menu provided for concurrent display together with the second menu in the end interactive graphical user interface, and
      perform an action corresponding to a selected entry within the third menu of the end interactive graphical user interface in response to another repeat transmission of the input command generated in response to a third actuation of the single navigation button,
   wherein the selected entry corresponds to a media content instance and wherein the action comprises at least one of playing, recording, and purchasing the media content instance.

2. The system of claim 1, wherein the action further comprises providing a contextual pop-up window having at least one option corresponding to the selected entry.

3. The system of claim 1, wherein the media content processing subsystem is further configured to provide, within the third menu of the end interactive graphical user interface, a graphical object that indicates an availability of the action corresponding to the selected entry.

4. The system of claim 1, wherein:
the user input device comprises a remote control device configured to communicate with the media content processing subsystem; and
the navigation thread comprises a plurality of content levels, the plurality of content levels including the first content level and the end content level, wherein the plurality of content levels are navigable by one or more actuations of the single navigation button on the remote control device.

5. The system of claim 1, wherein the end interactive graphical user interface further comprises, in a third region of the display, menu titles of one or more content levels other than the end content level, the menu titles including a title of the first menu.

6. The system of claim 5, wherein the end interactive graphical user interface does not include menus of the one or more content levels other than the end content level.

7. The system of claim 1, wherein:
the first interactive graphical user interface comprises a first viewing pane and a second viewing pane,
the first viewing pane comprises the first menu, and
the second viewing pane comprises the content listing.

8. The system of claim 1, wherein:
the media content processing subsystem is further configured to provide, within the third menu of the end interactive graphical user interface, a graphical object in the form of a directional arrow symbol indicating that the action corresponding to the selected entry is selectable by actuation of the single navigation button.

9. The system of claim 8, wherein the single navigation button is a right navigation button and the directional arrow symbol is a directional right arrow symbol.

10. The system of claim 8, wherein the user input device comprises a remote control device.

11. An apparatus comprising:
at least one processor;
at least one facility configured to direct the at least one processor to
generate a first interactive graphical user interface in response to a transmission of an input command generated in response to a first actuation of a single navigation button that is part of a user input device, the first interactive graphical user interface corresponding to a first content level or an intermediate content level within a navigation thread, the first interactive graphical user interface comprising:
a first menu in a first region of a display, the first menu including selectable entries, and
a content listing in a second region of the display, the content listing showing a preview of content items related to at least one of the selectable entries of the first menu,
generate an end interactive graphical user interface in response to a repeat transmission of the input command generated in response to a second actuation of the single navigation button, the end interactive graphical user interface corresponding to an end content level within the navigation thread, the end interactive graphical user interface comprising:
a second menu provided in place of the first menu in the first region of the display, the second menu including selectable entries corresponding to the content items shown in the content listing in the second region of the first interactive graphical user interface, and
a third menu provided in place of the content listing in the second region of the display, the third menu including selectable entries related to at least one of the selectable entries of the second menu, the third menu provided for concurrent display together with the second menu in the end interactive graphical user interface, and
perform an action corresponding to a selected entry within the third menu of the end interactive graphical user interface in response to another repeat transmission of the input command generated in response to a third actuation of the single navigation button; and
an output driver configured to provide the first and end interactive graphical user interfaces to the display for presentation to a user,
wherein the selected entry corresponds to a media content instance and wherein the action comprises at least one of playing, recording, and purchasing the media content instance.

12. The apparatus of claim 11, wherein the action further comprises providing a contextual pop-up window having at least one option corresponding to the selected entry.

13. The apparatus of claim 11, wherein:
the at least one facility is further configured to direct the at least one processor to provide, within the third menu of the end interactive graphical user interface, a graphical object in the form of a directional arrow symbol indicating that the action corresponding to the selected entry is selectable by actuation of the single navigation button.

14. The apparatus of claim 13, wherein the single navigation button is a right navigation button and the directional arrow symbol is a directional right arrow symbol.

15. The apparatus of claim 13, wherein the user input device comprises a remote control device.

16. A method comprising:
providing a first interactive graphical user interface to a display for presentation to a user in response to a transmission of an input command generated in response to a first actuation of a single navigation button that is part of a user input device, the first interactive graphical user interface corresponding to a first content level or an intermediate content level within a navigation thread, the first interactive graphical user interface comprising:
a first menu in a first region of the display, the first menu including selectable entries, and
a content listing in a second region of the display, the content listing showing a preview of content items related to at least one of the selectable entries of the first menu;
providing an end interactive graphical user interface to the display for presentation to the user in response to a repeat transmission of the input command generated in response to a first actuation of a single navigation button that is part of a user input device, the end interactive graphical user interface corresponding to an end content level within the navigation thread, the end interactive graphical user interface comprising:

a second menu provided in place of the first menu in the first region of the display, the second menu including selectable entries corresponding to the content items shown in the content listing in the second region of the first interactive graphical user interface, and a third menu provided in place of the content listing in the second region of the display, the third menu including selectable entries related to at least one of the selectable entries of the second menu, the third menu provided for concurrent display together with the second menu in the end interactive graphical user interface; and performing an action corresponding to a selected entry within the third menu of the end interactive graphical user interface in response to another repeat transmission of the input command generated in response to a third actuation of the single navigation button.

17. The method of claim 16, wherein the selected entry corresponds to a media content instance and wherein the performing of the action comprises at least one of playing, recording, and purchasing the media content instance.

18. The method of claim 16, wherein:
the method further comprises providing, within the third menu of the end interactive graphical user interface, a graphical object in the form of a directional arrow symbol indicating that the action corresponding to the selected entry is selectable by actuation of the single navigation button.

19. The method of claim 18, wherein the single navigation button is a right navigation button and the directional arrow symbol is a directional right arrow symbol.

* * * * *